United States Patent [19]
Chabry

[11] Patent Number: 5,785,027
[45] Date of Patent: Jul. 28, 1998

[54] INTERNAL COMBUSTION ENGINE INTAKE AND EXHAUST SYSTEMS

[76] Inventor: Alexander Chabry, 2/64 Market Street, Randwick New South Wales 2031, Australia

[21] Appl. No.: 727,767

[22] Filed: Oct. 8, 1996

Related U.S. Application Data

[62] Division of Ser. No. 284,626, Aug. 11, 1994, Pat. No. 5,595,062.

[30] Foreign Application Priority Data

Feb. 17, 1992 [AU] Australia ................... PL0916

[51] Int. Cl.⁶ ............................................ F02B 17/18
[52] U.S. Cl. ........................... 123/184.24; 123/184.34; 123/184.42
[58] Field of Search ................ 123/184.21, 184.24, 123/184.34, 184.42, 184.47, 184.53

[56] References Cited

U.S. PATENT DOCUMENTS

| | | |
|---|---|---|
| 2,106,427 | 1/1938 | Hansson . |
| 2,947,293 | 8/1960 | Arkus-Duntov . |
| 4,206,600 | 6/1980 | Feuling . |
| 4,210,107 | 7/1980 | Shaffer ................... 123/184.34 |
| 4,364,340 | 12/1982 | Kimura ................... 123/184.34 |
| 4,466,389 | 8/1984 | Arkus-Duntov . |
| 4,784,091 | 11/1988 | Okada et al. ............ 123/184.34 |
| 5,205,244 | 4/1993 | Nakamura et al. ...... 123/184.42 |

FOREIGN PATENT DOCUMENTS

| | | |
|---|---|---|
| 218778 | 2/1958 | Australia . |
| 0284466 | 9/1988 | European Pat. Off. . |
| 1167132 | 11/1958 | France . |
| 58-15718 | 1/1983 | Japan . |
| 92/03639 | 3/1992 | WIPO . |

Primary Examiner—Marguerite McMahon
Attorney, Agent, or Firm—Spencer & Frank

[57] ABSTRACT

An intake system (3, 4, 9) for a reciprocating internal combustion engine adapted to control operation of the engine to produce a high level of torque across a wide range of engine revolutions. The intake system is formed by a plenum (3) feeding a plurality of manifold tubes (4) dimensioned so as to improve volumetric efficiency of the engine by inducing ram air effects in a naturally aspirated engine over a wide range of rotational speeds.

12 Claims, 11 Drawing Sheets

INTERNAL COMBUSTION ENGINE INTAKE AND EXHAUST SYSTEMS

CROSS REFERENCE TO RELATED APPLICATION

This application is a division of application PCT/AU/ 00066 filed Feb. 17, 1993, and U.S. application Ser. No. 08/284,626, filed Aug. 11, 1994, now U.S. Pat. No. 5,595, 062.

BACKGROUND

This invention relates to an intake and exhaust system principally for reciprocating piston internal combustion engines.

Natural laws of flow dynamics govern the Volumetric Efficiency (VE) of any engine at a particular RPM. Intake manifold efficiency, valve and port size, camshaft valve timing and exhaust manifold configurations are a few of the more readily identifiable factors affecting VE. However there is a "ram" effect inherent in all engines that helps improve VE, in the same way a supercharger increases horsepower.

The object of this invention is to provide improvements in three major factors being the intake system, exhaust system and camshaft valve timing ultimately to function as a unit which may be referred to as the Inertia-Supercharging & Superscavenging Process (ISSP) system.

The concept of the ISSP system is to produce over the entire RPM range of any engine a substantially greater than conventional amount of atmospheric pressure differential within the cylinders through both ISSP intake and exhaust systems, thereby causing the outside atmospheric pressure through the ISSP intake system to force a substantially greater than conventional amount of air mass into the substantially lower than conventional cylinder pressures on the intake and compression strokes, thereby producing higher than conventional cylinder pressures on the combustion stroke which facilitates forcing of a substantially greater than conventional amount of gas column flow through a self extracting ISSP exhaust system which produces a lower than conventional pressure environment behind the gas column flow which also contributes to producing substantially lower than conventional cylinder pressures on the exhaust stroke thereby lowering cylinder pressures even further for the next intake stroke cycle. By using the aspects of the present invention independently or in combination it is possible to substantially increase Volumetric Efficiency and torque levels and substantially reduce fuel consumption over substantially the entire RPM range of any engine which will provide an alternative to previous conventional systems designed to produce performance with economy.

DESCRIPTION OF THE INVENTION

The invention provides a reciprocating piston internal combustion engine comprising:

at least one cylinder having a cylinder wall, at least one intake port and at least one exhaust port, the ports being disposed on the cylinder wall;

at least one intake valve disposed at a corresponding intake port for regulating a flow of intake gas into the cylinder;

at least one exhaust valve disposed at a corresponding exhaust port for regulating a flow of exhaust gas out of the cylinder;

a piston in the cylinder mounted for reciprocal motion within the cylinder, the piston further being adapted to assume a bottom dead center position and a top dead center position; and a plurality of manifold tubes comprising:

a least one intake manifold tube connected to a corresponding intake port;

at least one exhaust manifold tube connected to a corresponding exhaust port;

wherein each of the intake manifold tubes comprises a plurality of pipes connected end to end and including an end pipe disposed closest to a corresponding port, each of the pipes having a constant cross-section, the cross section of the pipes increasing incrementally in a direction away from the end pipe, and a tapered portion being connected to the end pipe at the exit end thereof, and to an adjacent one of the pipes at the entry end thereof; and further including a plenum chamber device comprising an intake manifold, the intake manifold having at least one manifold outlet connected to a corresponding intake manifold tube, the plenum chamber device thereby being disposed upstream of and in flow communication with the intake port.

Optionally, at least one intake port includes a plurality of intake ports, and the plenum chamber device is divided into two similar chambers.

The engine may further include a plate for dividing the plenum chamber device into the two similar chambers, the plate having at least one balancing hole at a central region thereof. Optionally, the balance hole is radiused.

Optionally, the intake manifold of the plenum chamber device includes a manifold inlet located at a top center region thereof, and internal manifold walls defining smooth radiused transitions from the manifold inlet to the manifold outlet.

Optionally, at least one intake port includes a plurality of intake ports;

at least one manifold outlet includes a plurality of manifold outlets each corresponding to a respective intake manifold tube, at least one of the plurality of manifold outlets meeting its respective manifold tube at a right angle thereto, the respective manifold tube further meeting its respective intake port at a right angle thereto, the respective manifold tube being thereby curved.

Optionally, the plurality of intake ports include at least four intake ports;

at least one intake manifold tube includes at least two intake manifold tubes leading to the two chambers of the plenum chamber device.

Optionally, the engine further comprises at least one tapered tube connected to a larger end thereof to a corresponding inlet port and at a smaller end thereof to the end pipe, the tapered tube being longer than the end pipe.

Optionally, at least one intake manifold tube includes a first pipe connected to a second pipe which is in turn connected to a third pipe, the third pipe being the end pipe, a cross section of the first pipe being larger than a cross section of the second pipe and the cross section of the second pipe being larger than a cross section of the third pipe, at least one intake manifold tube further including tapered portions disposed to connect the first pipe to the second pipe and the second pipe to the third pipe for providing a smooth flow transition into each of the pipes.

Optionally, each of the two intake manifold tubes includes two tertiary pipes of constant cross section and one secondary pipe of constant cross section joined to the two tertiary pipes such that the tertiary pipes form a fork with respect to the secondary pipe, each of the tertiary pipes being a respective end pipe;

the plurality of manifold tubes further includes a primary pipe of constant cross section joined to the secondary pipes of the two intake manifold tubes such that the secondary pipes form a fork with respect to the primary pipe, the cross section of the primary pipe being larger than the cross section of the secondary pipes, and the cross section of the secondary pipes being larger than the cross section of the tertiary pipes; and the tapered portion of each of the two intake manifold tubes is a first tapered portion, each of the two intake manifold tubes further including a second tapered portion connecting the secondary pipes to the primary pipe for providing a smooth flow transition into each of the pipes.

Optionally, the two chambers of the plenum chamber device are located centrally, and vertically above the intake manifold;

the tapered portion is a first tapered portion, each of the manifold tubes further including a second tapered portion having an entry end and an exit end, a cross section of the exit end being larger than a cross section of the entry end; and one of the plurality of pipes is a curved pipe connecting the entry end of the second tapered portion to at least one of the two chambers of the plenum chamber.

BRIEF DESCRIPTION OF THE DRAWINGS

The invention will now be described by way of example with reference to the drawings, in which.

DESCRIPTION OF EMBODIMENTS

Figure 1:
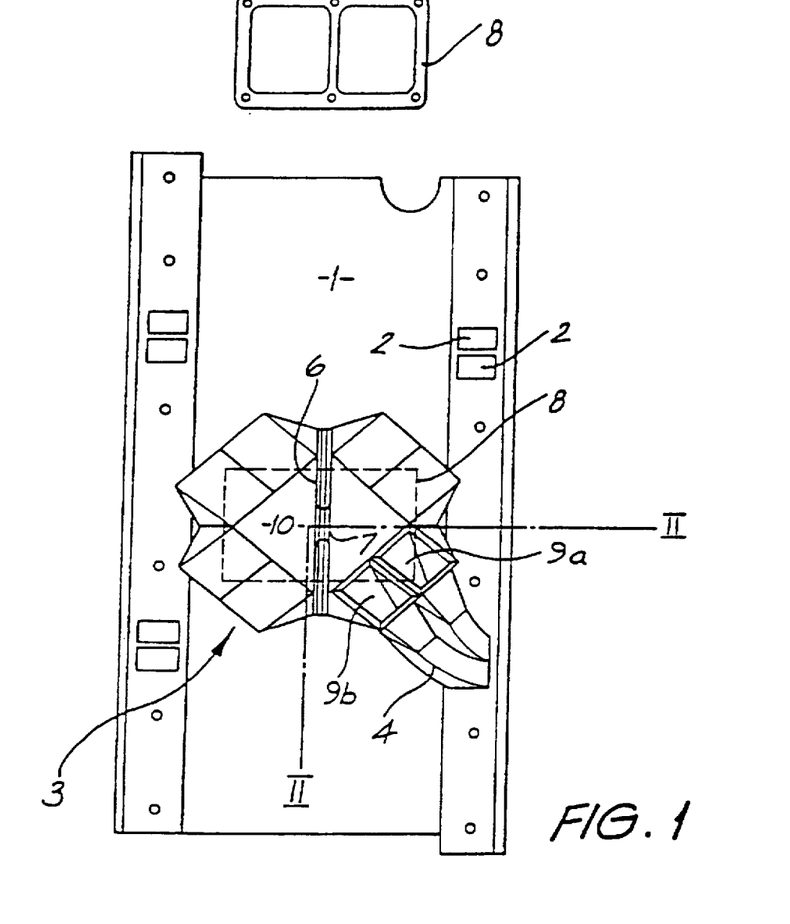
FIG. 1 is a sectioned plan view of an intake system made in accordance with the invention.

FIG. 1 is a general view from above an engine 1, showing only the details necessary in order to reproduce and understand the device of the invention. Included in engine 1 are eight rectangular inlet ports 2. Each port leads to a combustion chamber of the engine in the conventional manner. The engine 1 is of the V8 type configuration. Within the void between the two banks of inlet ports 2 resides the intake system positioned generally centrally as is known in the art. The intake system includes a manifold 3 and eight manifold tubes 4, of which only two are shown. Each manifold tube 4 leads from a respective manifold outlet 9 to a respective inlet port 2.

Figure 3A:
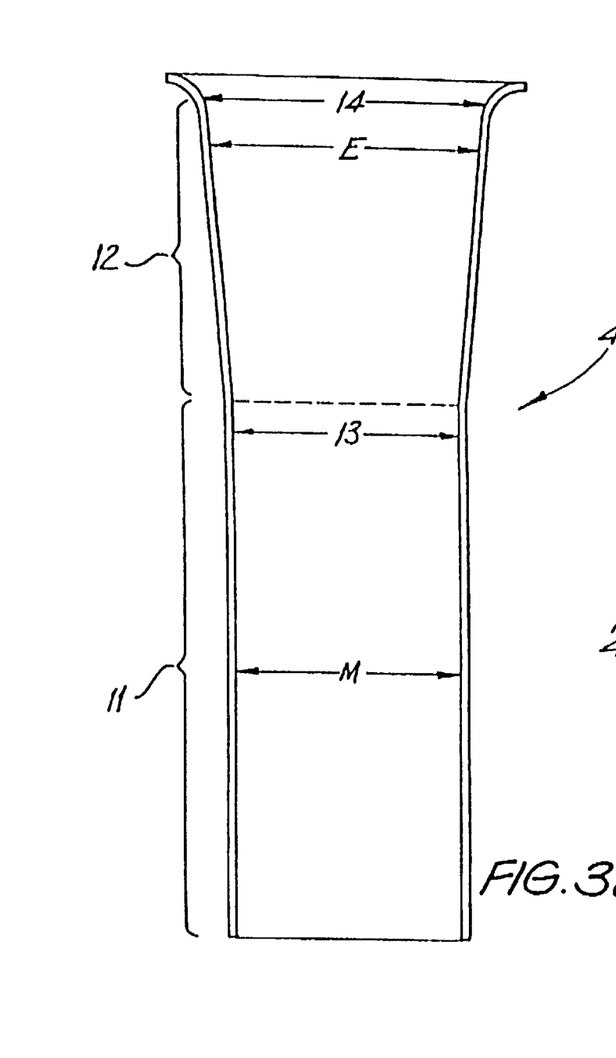
FIG. 3 includes three views, two orthogonal sections and a plan view, of a component of the device of FIGS. 1 and 2.
Figures 3B, 3C:
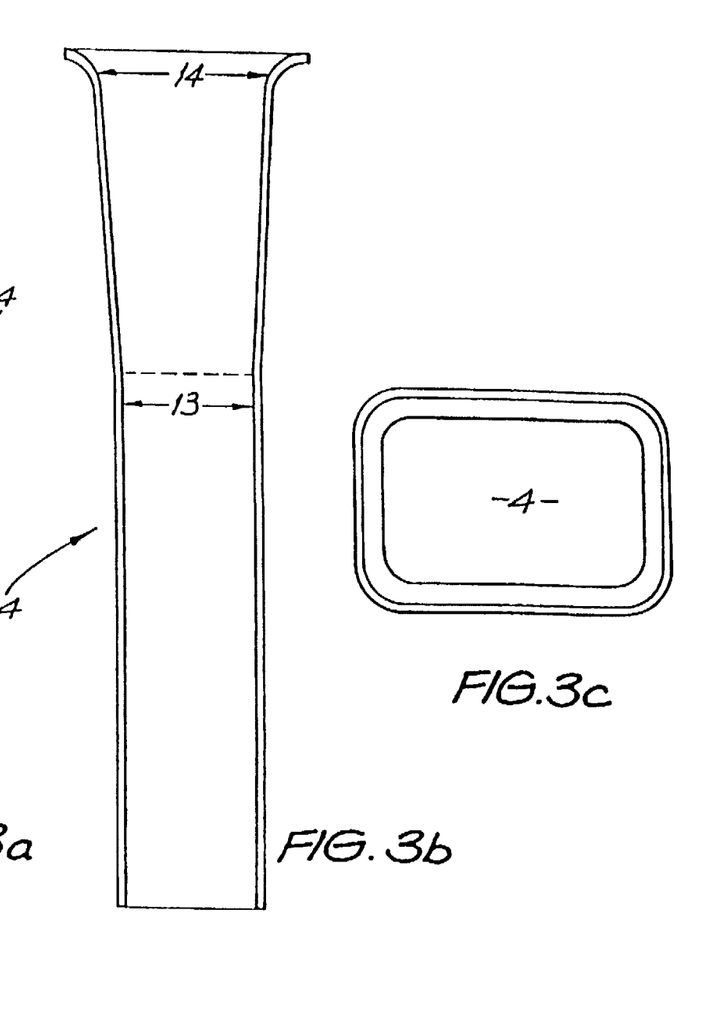

The design of the manifold tube 4 is shown more fully in FIGS. 3a–c. Each tube 4 includes a constant portion 11 having a constant cross-sectional shape along its length.

At an entry end of each tube 4 is a tapered portion 12 which has an entry of greater cross section 14 and a lesser cross-section 13 identical to the cross section of the constant portion 11. The dimensions are given by the earlier mentioned equations.

The manifold 3 includes a generally rhomboid shape, when viewed from the top, plenum chamber having two manifold outlets 9 in each of its four side walls. The through axis of each manifold outlet 9 points generally downwardly and obliquely transverse towards its respective inlet port 2. Thus the connecting manifold tube 4 includes a curve of no more than approximately 8° from the tapered tube exit to the inlet port 2 in order to provide a smooth continuous air or air/fuel mixture flow connection. For each of the manifold tubes 4, the tube 4 which is closest to the centre of the engine is slightly more curved, and thus the manifold outlets 9a, being closer to the centre of the engine than the manifold outlets 9b, are slightly lower and the floor 10 of the plenum chamber slopes slightly downwardly from its centre.

Figure 2:
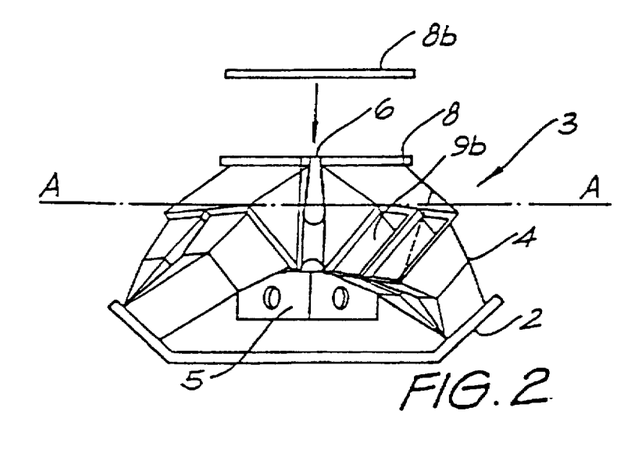
FIG. 2 is a partially sectioned front elevating view II—II of the device of FIG. 1.

The plenum chamber is centrally divided by a plate 6 having the necessary width to accommodate a suitable radius for the central hole 7. From floor 10 the divider plate is of parallel width to just past the central hole radius where it tapers to a narrow width to the top surface of flange 8 and being a width of slightly less than the closest adjoining throttle bores of a typical carburettor. The central hole is radiused (25% of the hole diameter) so as to provide a balance connection between the two halves formed by the plate 6. At low engine speeds an effective balance flow of air or air/fuel mixture travels through the hole 7, while at high engine speeds the hole is effectively resistive to such flow.

The flange 8 has a large rectangular opening separated by the divider plate 6 to give one approximate square-like opening on either side of the divider plate. The carburettor adaptor flange plate 8b may be designed to suit a single four-barrel carburettor, dual four-barrel carburettors, triple two-barrel carburettors, up to dual six-barrel air control throttling devices or some alternative. The internal walls of the plenum chamber are smoothly radiused from the flange 8 to the various outlets 9.

The plenum chamber is in thermal contact with a hot water heat exchanger 5 positioned under the floor 10 of the plenum chamber. Conveniently, the heat exchanger 5 and body of the manifold 3 are of a single unit construction. The heat exchanger 5 provides a normal engine operating water temperature in order to promote efficient vaporisation of fuel in the connected carburettor, without over vaporisation associated with higher ambient temperatures common with exhaust heating.

Figure 4:
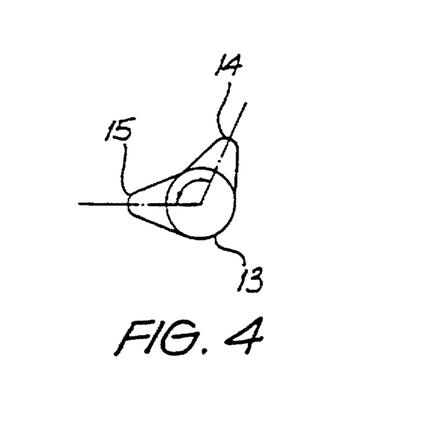
FIG. 4 is a profile view of a cam for use in an engine in conjunction with the system of the invention.

Additional benefits in performance and economy are gained from this intake and exhaust system by fitting camshafts of the form of FIG. 4 having valve timing and point of maximum lift modified from typical contemporary values. Typical contemporary engines have lobe separation angles (between respective intake 14 and exhaust 15 camshaft lobes) in the region 106°–114° with installed lobe centrelines in the region 102°–110°. In such an engine, after fitting the above described intake system and later described exhaust system, optimum relative phasing between intake 14 and exhaust 15 cam lobes will include a similar lobe separation angle in the region 106°–116° but with a modified installed lobe centreline in the region 86°–94° which in effect will have early intake and exhaust closing points necessary for optimum performance with economy and an installed lobe centreline in the region 76°–84° for maximum economy with less top end performance. Also, optimum valve timing duration will include the employment of a dual pattern design camshaft 13 with 10° more exhaust duration for increased performance with economy and 10° less exhaust duration for maximum economy.

The angular timing of the closing of intake and exhaust valves is highly important. Equations —11— and —12— at the end of this description define I as the new intake closing point ABDC and EX as the new exhaust closing point BTDC which is required for optimum intake and exhaust closing with this system.

As an example, with the above described intake features, an otherwise typically performance modified 360ci Chrysler V8 engine having about *222° intake duration and operating at peak RPM of about 5,000 and having typical intake closing of about *35°–39° ABDC will have similar peak RPM but with an optimum intake closing in the range *16°–20° ABDC when used with this system for increased performance with economy and an optimum intake closing in the range *4°–8° ABDC for maximum economy with less top end performance.

*Angular durations measured @0.050" valve lift.

Optimally, the actual angular duration for which the intake valves remain open is given as IVOD in equation —16—.

Equation —5— at the end of this description, defines the height of valve lift L which is considered optimal for inclusion in a system utilising this invention. Such valve lift L maintains the desired gas flow velocity at the stage of entering the combustion chamber.

With this system intake charge density in the cylinders over the entire rev range is greater than conventional engines therefore the combustion rate is faster. As a result less time is needed to burn the mixture and therefore less ignition advance is required over the entire rev range. Therefore to achieve optimum performance with economy and avoid detonation (premature ignition):

1) It has been found that the compression ratio will be less than 8.5:1 due to higher cylinder pressures in naturally aspirated engines.

2) It has been found because of increased cylinder temperatures that the standard engine's recommended heat range spark plug is reduced by several steps in the heat range to a colder spark plug. For example, a standard 360ci Chrysler V8 engine using any brand of spark plug and of equivalent heat range to NIPPONDENSO plugs W16EPU is reduced to colder plugs equivalent to W24EPU and colder when utilising the system of this invention.

3) It has been found that the mechanical advance (initial plus centrifugal) will have in the region *18°–28° of total ignition lead at peak RPM.

4) It has been found that the centrifugal-advance curve will have a slow rate of advance in the region *6°–25° less average incremental advance up to peak RPM when compared to standard centrifugal-advance curves used by automakers.

5) It has been found that the centrifugal advance curve will begin later in the region 1,500–2,000 RPM when compared to conventional centrifugal advance curves which begin in the region 700–1,200 RPM.

6) It has been found that the initial ignition advance will be in the region –3°–6° BTDC.

7) It has been found that the vacuum advance will have in the region *5°–15° of additional advance.

*Figures expressed in crankshaft degrees.

Two types of intake manifolds are shown in FIGS. 10–13, preferably to be used with direct port fuel injection and, are designed around the constant velocity barrel (CVB) principle which is defined as using the air mass inertia and atmospheric pressure within a constant cross-sectional area length of tube to force a greater air mass into a smaller constant cross-sectional area and length of tube by virtue of the kinetic energy produced in a constant flowing air mass at any particular RPM. Both are of the cross ram type and can be used with either two side draught or down draught carburettors or two air control throttle devices with one on each side feeding the opposite intake ports of a typical V8 engine.

Figure 10:
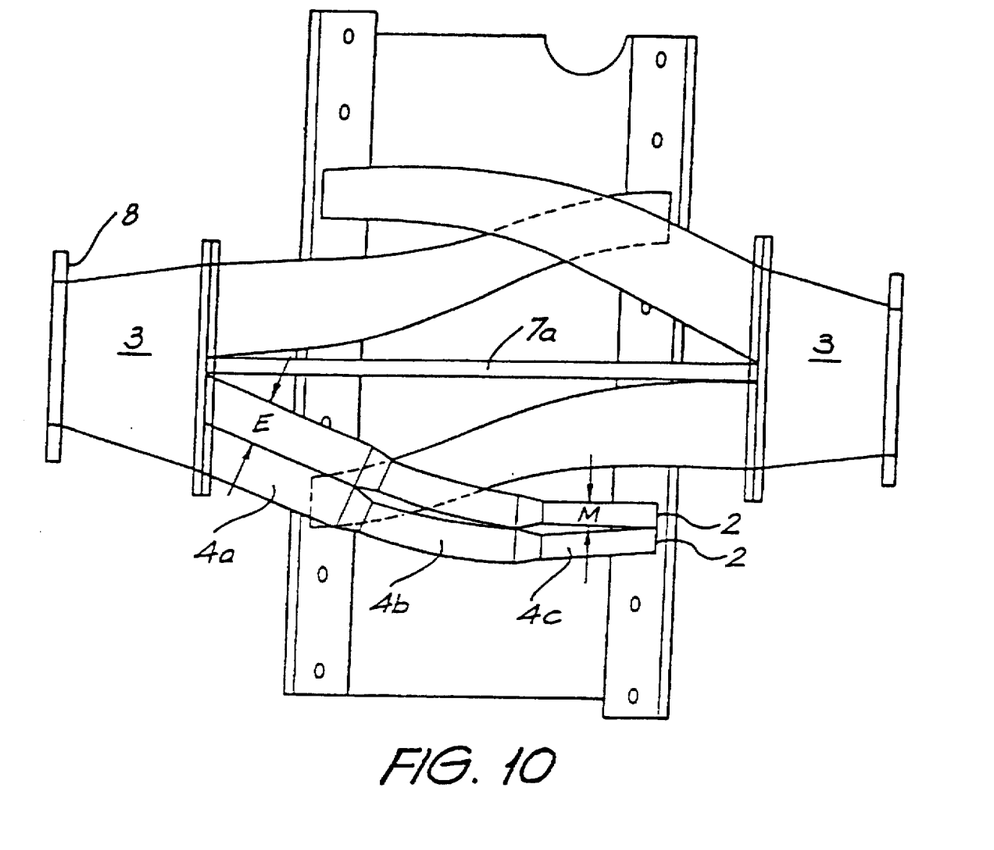
FIGS. 10 to 13 show three manifolds being alternatives to those of FIGS. 1-3.
Figure 11:
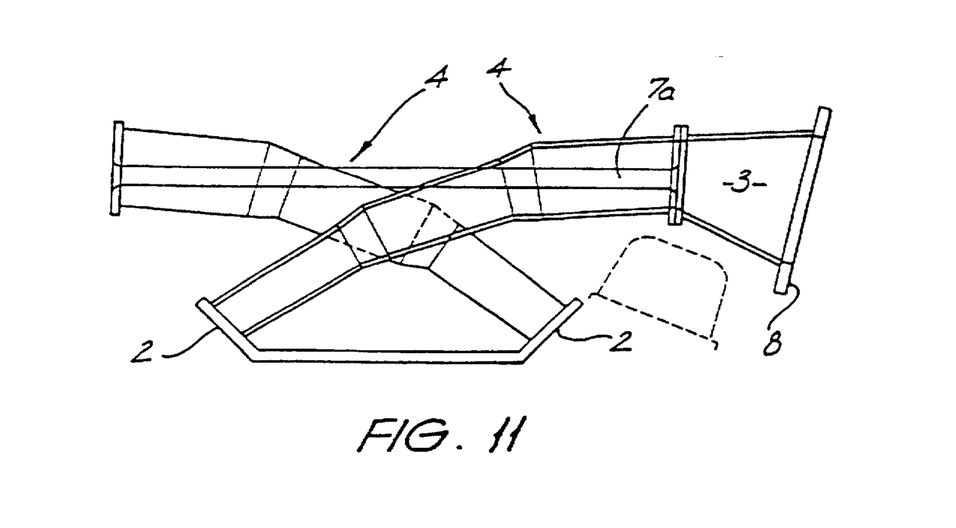
Figure 12:
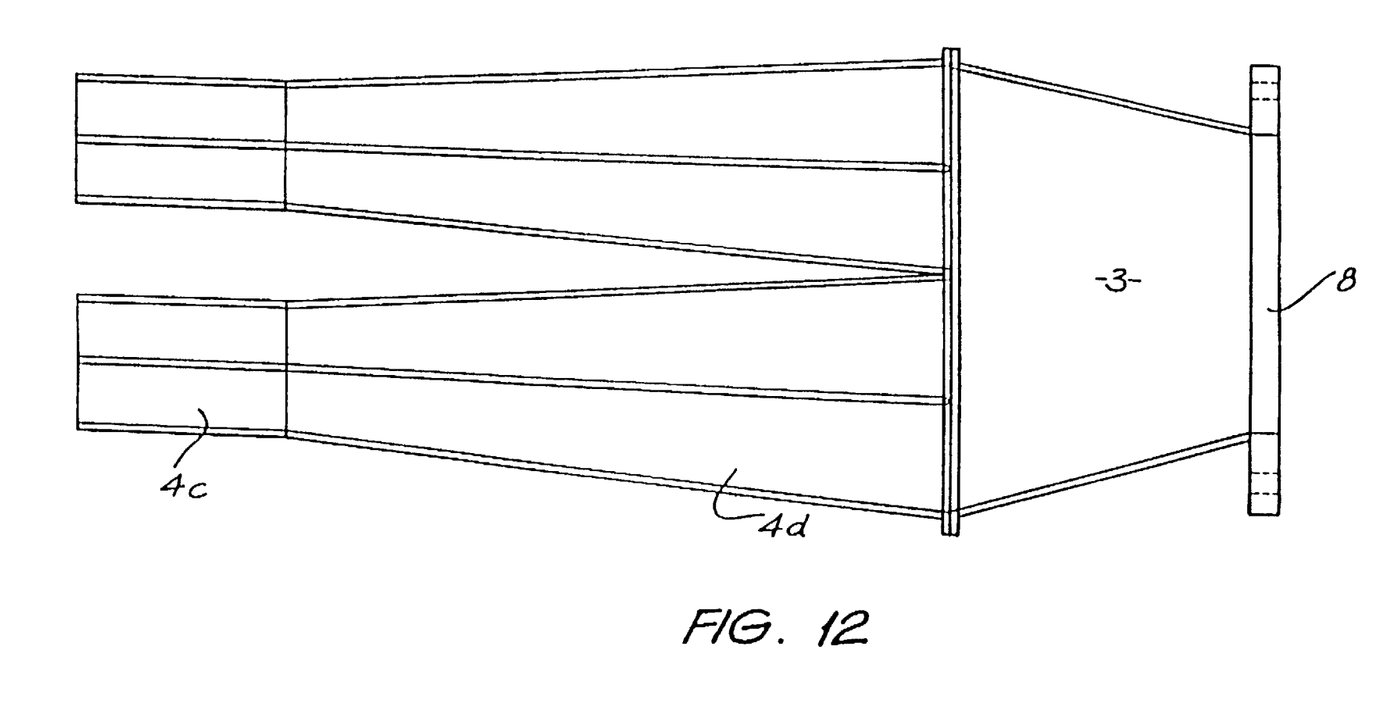

One type of intake manifold shown in two variations in FIGS. 10–12 has an independent runner configuration of four intake runners 4 leading from the plenum chamber to the intake ports.

Figure 13:
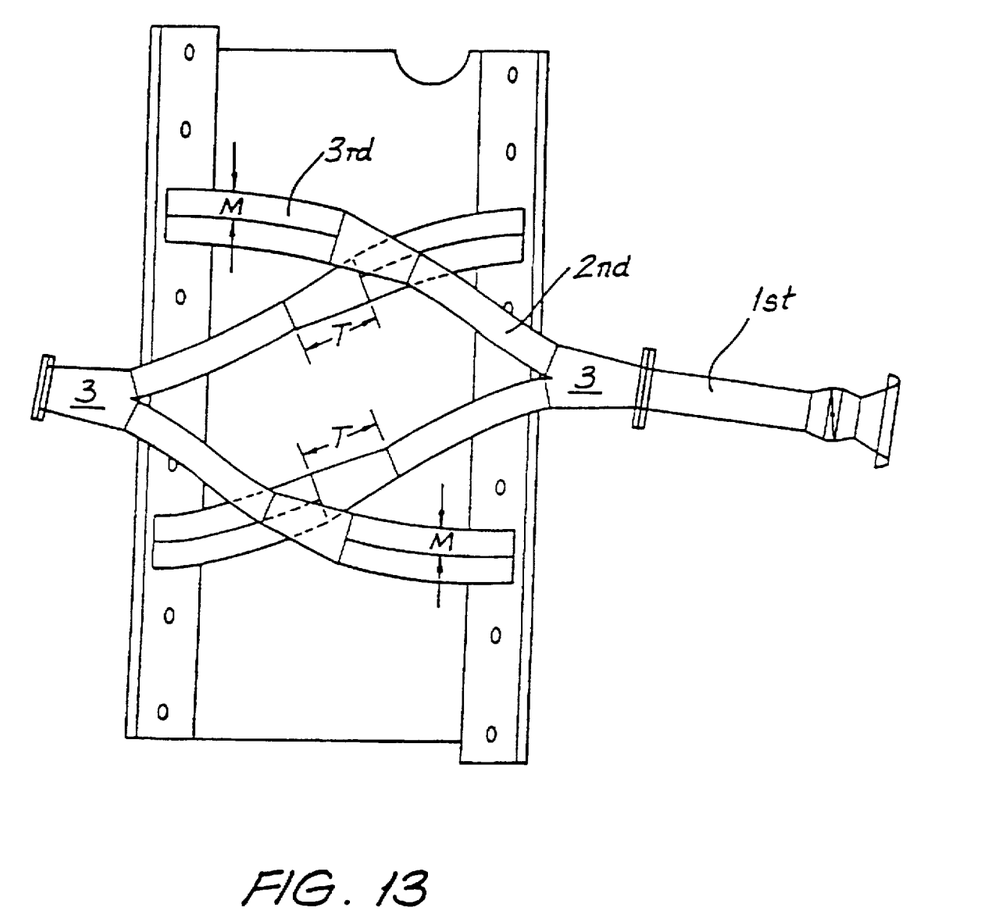

The second type of intake manifold shown in FIG. 13 has a TRI-Y runner configuration of one intake runner into two and then into four ports.

The intake manifolds at FIGS. 10 and 11 have three progressively smaller steps of constant cross-sectional area runners 4a, 4b, 4c leading from the plenum chamber 3 to intake ports 2 and each of the three runner lengths will likely vary equally from approximately 2"–6" depending on the space available in the engine compartment. The central runner (4b) diameters are obtained by subtracting the diameter of equation —1— (which provides the diameter of runner 4a) from the diameter of equation —3— (which provides the diameter of runner 4c) and then averaging the two diameters.

The larger parallel intake runner 4a sections act as constant velocity barrels (CVB) optimally to force a greater mass of air into the proceeding smaller diameter intake runner sections 4b and 4c (which also act as CVB's) when used together cause the high momentum of the air mass at the beginning of each of the three stages to be simultaneously compressed and accelerated to a higher velocity to achieve a ram air effect to the cylinders over the rev range using this system.

The intake manifold configurations viewed from the front of the engine will have the 3rd intake runner section 4c length aligned with the intake port center line. The 2nd and 1st runner lengths 4b and 4a will have a 8° curve to enable the intake manifold runners to clear the engine rocker covers and bonnet of typical vehicles.

The 1st intake runner 4a center line is approximately aligned with the plenum chamber 3 will have tapered walls diverging on the side walls and converging on the upper and lower walls from the flange plate 8 to the 1st intake runner 4a entry, where different lengths from approximately 2"–15" may be used to ultimately fine tune initial air flow volume and velocity rates from plenum chamber 3 into intake runners 4.

With all else remaining the same a useful alternative to the above described intake runners is to replace the 2nd and 1st runner sections joined by tapered sections with a tapered runner section 4d as shown in FIG. 12 with an entry cross-sectional area of equation —1— and an exit cross-sectional area equal to the cross-sectional area of 3rd runner 4c.

NOTE: The 3rd runner section 4c will use a constant cross-sectional area runner of suitable length to achieve the constant velocity barrel (CVB) principle.

The intake manifold at FIG. 13 has three progressively smaller steps of equal length constant cross-sectional area runners 1st, 2nd and 3rd leading from the plenum chamber 3 to intake ports 2, and each of the three runner lengths will vary equally from 2"–6" depending on the space available in the engine compartment.

Each larger single runner which joins into smaller paired off 2–3 runners will have an equivalent cross-sectional area to the paired off 2–3 runners' total cross-sectional area.

For example, in FIG. 13 the central second runner will have two times the cross-sectional area of 3rd runner equation —3— with the 1st runner having two times the cross-sectional area of 2nd runner.

The TRI-Y runner configuration of FIG. 13 will have tapered sections (between runners) and each will have no greater than 8° taper with a length of 2"–4". The height and width of each following runner section will increase proportionally from the 3rd runner to the 1st runner. A ¼" long converging centre divider protrudes into the tapered section having a small radius at its apex to help smooth entry of air flow into the runners at high velocities.

The four independent runner configuration of FIGS. 10 and 11 will have tapered sections (between runners) and each will have no greater than 8° taper with a length of ⅝"–1". The height and width of each following runner section will increase proportionally from the 3rd runner 4c to the 1st runner 4a.

The intake manifold of FIGS. 10–12 has a single circular bored balance pipe 7a of a diameter given by equation —4— connecting the opposite plenum chambers. The balance pipe opening has a radiused entry (25% of the hole diameter) at the plenum chamber end. The Tri-Y design intake manifold FIGS. 13 and 14 will have two circular balance pipes with each one exiting perpendicularly from the vertical side wall of each plenum chamber 3 and having a 90° angle radiused bend towards the direction of air flow on a horizontal plane and with a 45° angle radiused curve entering 3rd intake runners of each cylinders No 4 and 7, respectively, on top of the 3rd runners entry end.

Figure 14:
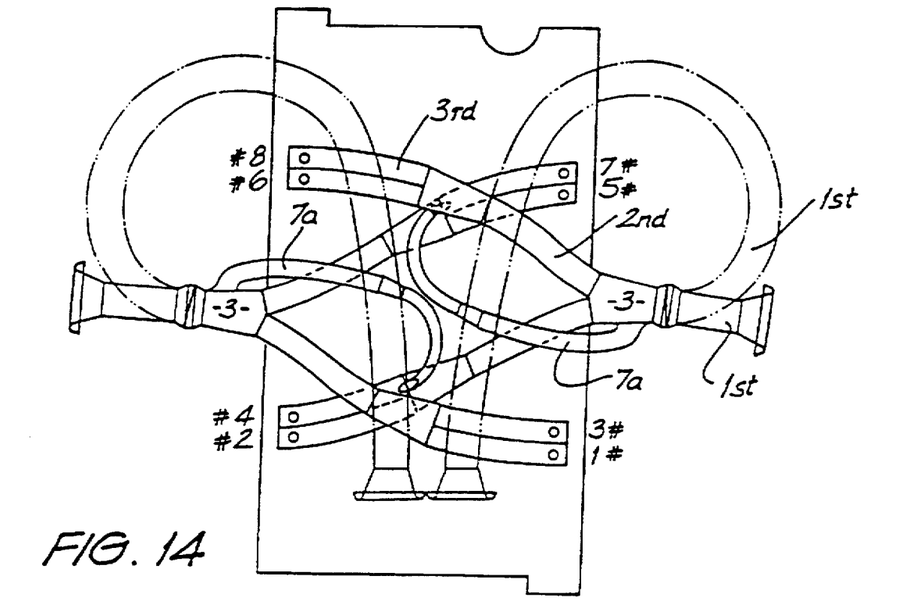
FIG. 14 is a schematic plan view of a modified intake manifold of the general form of FIG. 13.
Figure 15:
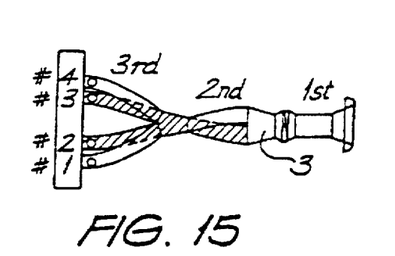
FIG. 15 is a schematic plan view of an intake manifold in accord with the invention suitable for a four cylinder in-line engine.
Figure 16:
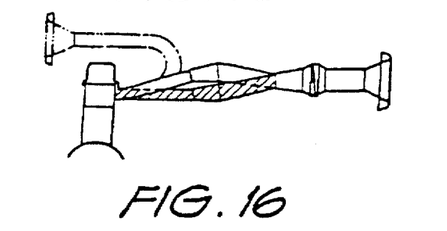
FIG. 16 is a front elevation of the schematic of FIG. 15.
Figure 17:
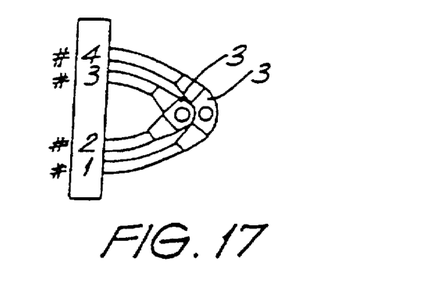
FIG. 17 is a schematic plan view of an intake system of the type of FIG. 18 but modified to use with a down draught throttle device.
Figure 18:
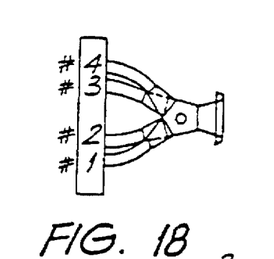
FIG. 18 is a schematic similar to FIG. 17 but suitable for side draught throttle devices.
Figure 19:
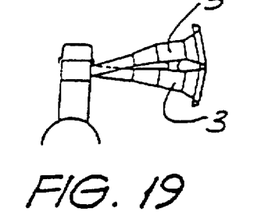
FIG. 19 is a front elevation of FIG. 18.
Figure 20:
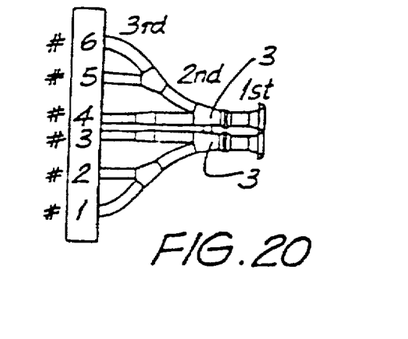
FIG. 20 is a schematic plan view of another embodiment suitable for side draught throttle devices.

The balance pipe entry end will have a cross-sectional area two times the cross-sectional area of equation —4— and at the exit end the balance pipe will have a tapered portion length T joining the large to small diameter balance pipe sections.

The balance pipe equation —4— will have a length similar to the 3rd intake runner length.

The above described balance pipe design will be suitable for V-configuration engines that have a firing order which causes any two cylinders on the same half of the engine to consecutively draw air from the same plenum chamber. It has been found that the design of these intake manifolds requires a balance pipe or hole to balance intake charge density in consecutive firing cylinders that have their intake runners leading from the same plenum chamber to enable the engine to operate smoothly at all RPM.

It has also been found that using these intake manifold designs without any balance pipe or hole caused the engine to idle violently and stall often with rough and erratic low speed operation which gradually smoothed out from mid to top operating speeds.

Equation —3— where F=550±50 ft/sec is suitable for giving the cross-sectional area of runner 4c for conventional mass produced performance with economy engine cylinder heads of 65°–85° (prefer optimum 10°–25°) intake port angles. However, in equation —3— F=820+50 ft/sec is more suitable for economy engine cylinder heads of 10°–25° intake port angles (although conventional 65°–85° angles are adequate but not optimum) which will achieve optimum economy and flow efficiently when combined with an intake runner of no greater bend or curve than 8° when used with this system.

While it is highly desired to maintain the third runners 4c with constant cross-sectional area along their length, many of the other features shown in FIGS. 10–13 can be modified or interchanged. For instance the 1st runner and "Y" branch shown in FIG. 13 may be deleted with the 2nd runners exiting from a larger plenum chamber 3, thus shortening the total length of the intake runners. Alternatively the 1st runner alone may be deleted to give the tapered plenum chamber additional tuning length.

In addition the 1st and/or 2nd parallel runner sections in FIG. 13 may be replaced by tapered runner sections with entry diameters equal to the exit diameters of previous tapered runners. Additionally the tapered plenum chamber 3 and the constant circular shaped 1st runner in FIGS. 13 and 14 may be replaced with a constant rectangular shaped runner of equivalent cross-sectional area to the circular shaped 1st runner. The entry end cross-sectional area of the circular 1st runner will likely have a single throttle plate body attached with approximately a 4 mm larger diameter throttle plate and with a tapered portion length T (equation —2—) between the two diameters as shown in FIG. 13.

At the entry end, the single throttle plate opening will have two tapered portions with the first tapered portion of length T converging to a diameter equal to the 1st runner followed by the second tapered portion of length T diverging to a larger opening two times the cross-sectional area of the 1st runner and having a radiused entry (25% of the opening diameter) in which a suitable air filter will be mounted to the outside rim of the radiused opening.

The entry end of the tapered portion between the 2nd and 1st runners will have a circular shape with an equivalent cross-sectional area to the 1st runner forming a transition into paired off rectangular shapes at the exit end of the tapered portion.

With the above described modification, a useful alternative will likely have the single throttle plate body with adjoining tapered portions on either side repositioned at the exit end of the 1st runner, allowing the constant circular tube section between the single throttle plate body and radiused opening entry to have its length and direction adjusted more freely as an air ram tuning device as shown in FIG. 14.

Alternatively the two adjoining tapered portions of the above described modification may be deleted and replaced with one tapered portion length T diverging from the throttle plate entry opening to two times the cross-sectional area of the throttle plate opening and again having a radiused entry (25% of the opening diameter).

The above described modifications are more suitable for either an air control single throttle plate body used in conventional fuel injection systems or a single barrel side draught constant depression (CD) carburettor.

Alternatively, two or more single barrel CD carburettors or air control throttle devices may be used in place of a single throttle body whereby the intake manifold entry end will have an oval tapered portion of length T at an entry end equal to the exit end diameters of CD carburettors or air control throttle devices, and an exit end diameter equal to the entry end diameter of the 1st runner.

Alternatively, as shown in FIG. 14, the Tri-Y intake manifolds may have each a circular 1st runner gently curve back around (shown in dashed lines) approximately 260° towards the rear of the engine's centreline, with a 25% radiused opening to which a suitable air filter will be attached.

Figure 5:
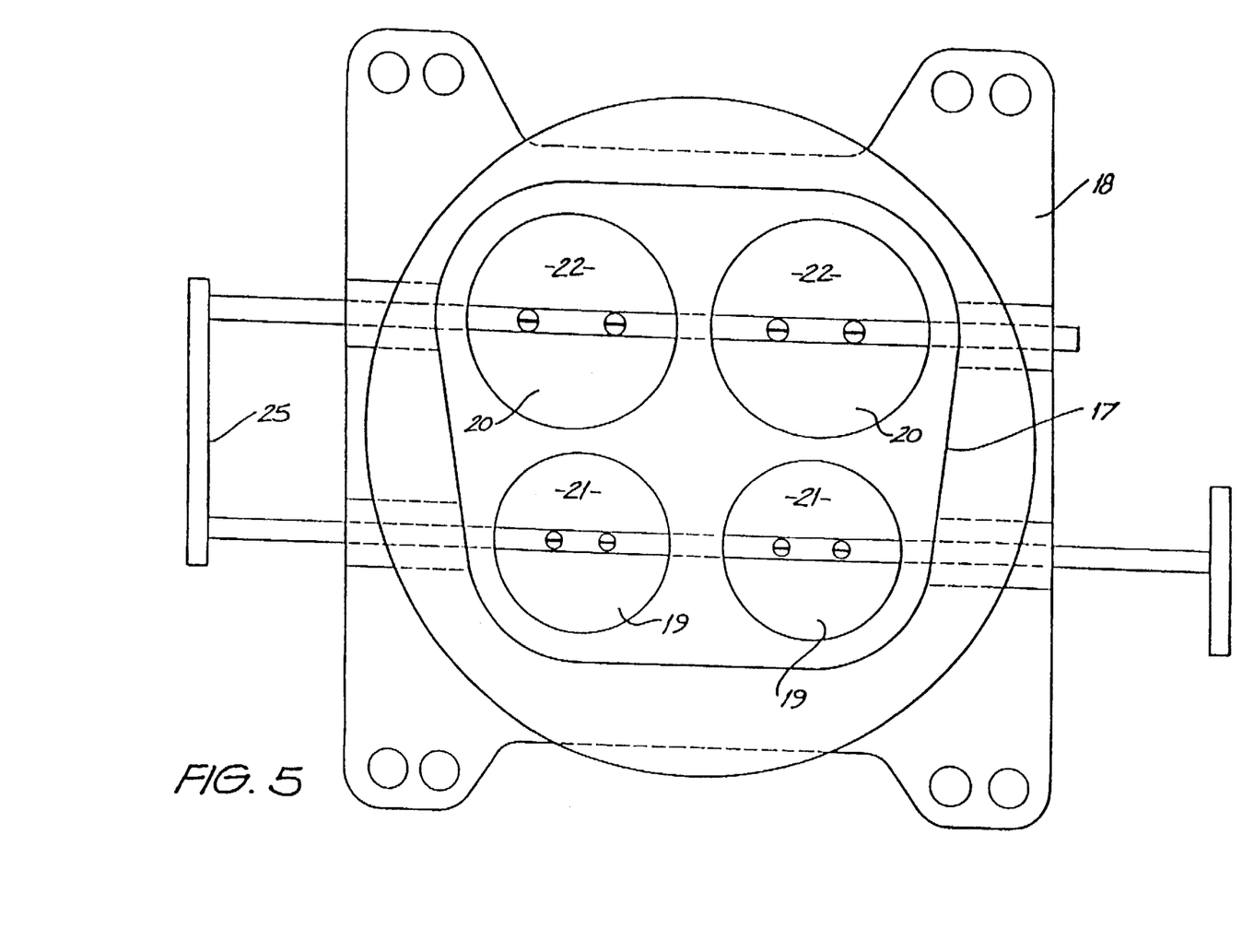
FIG. 5 is a plan view of an air control throttle.
Figure 6:
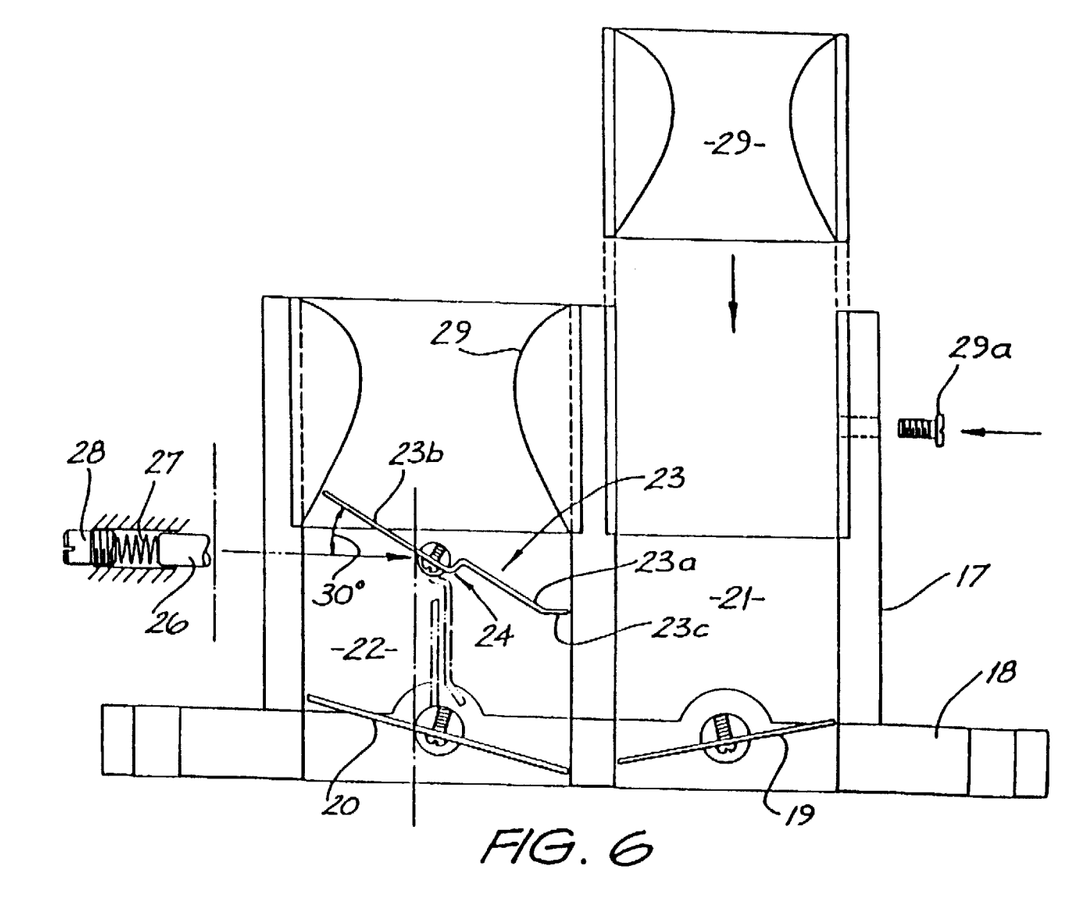
FIG. 6 is a side sectional view of the air control throttle of FIG. 5.

FIG. 5 shows the throttle body 17, its flange 18 for attachment to an intake manifold, a pair of primary throttle plates 19 and a pair of secondary throttle plates 20. The sectional side view of FIG. 6 shows one pair of primary and secondary throttle bores 21 and 22 respectively. Within the secondary throttle bore 22 is a secondary air valve 23 located above the secondary throttle plate 20 and, when the air valve 23 and secondary throttle plate 20 are fully open, they overlap.

The secondary air valve 23 includes in one half an offset portion 24 so that when the air valve 23 and throttle plate 20 are fully open they present a substantially smooth single blade to the air flow through the secondary bore 22.

The primary and secondary throttle plates 19 and 20 are turned by their shafts by a progressive opening linkage 25. The linkage 25 is connected to the car throttle pedal and initially opens the primary throttle plates 19 during a first portion of throttle setting, and thence commences to also open the secondary throttle plates until all plates are fully open at the full throttle setting. The secondary air valves 23 pivot on a valve shaft 26 which is lightly spring-loaded, by spring 27, into the closed position shown in solid outline in FIG. 6.

Screw adjuster 28 adjusts the tension of spring 27. The secondary air valves 23 are asymmetrical, the downstream half 23a being of greater area than the upstream half 23b. Furthermore, the valve half 23a includes a lip 23c at its greatest radial extent. The combination of the lip 23c and the asymmetrical shape of the valve plate 23 opens the valve 23 against the tension of the spring 27 by the atmospheric pressure differential being reduced in response to greater air flow through the secondary throttle bore 22. The opening/closing action of the air valves 23 maintain high local air flow velocities even during low air demand, that is at low throttle settings. By maintaining these higher air velocities at low throttle settings, air flow momentum is maintained high at the low throttle settings and better volumetric efficiency of the engine is obtained.

The entry point to the throttle bores 21 and 22 is defined by replaceable venturis 29 that have retaining screws 29a allowing venturis 29 to be firmly secured to the throttle body 17. The venturis 29 will generally be of a different opening diameter for each of the primary and secondary bores 21 and 22. Also, the replaceable venturis 29 can be provided in a vast range of opening diameters so as to provide a range in optimum air flow rates. This allows similar throttle bodies 17, and internal components, to be used in a vast variety of engines needing only to select the appropriate sized replacement venturis 29.

Figure 7:
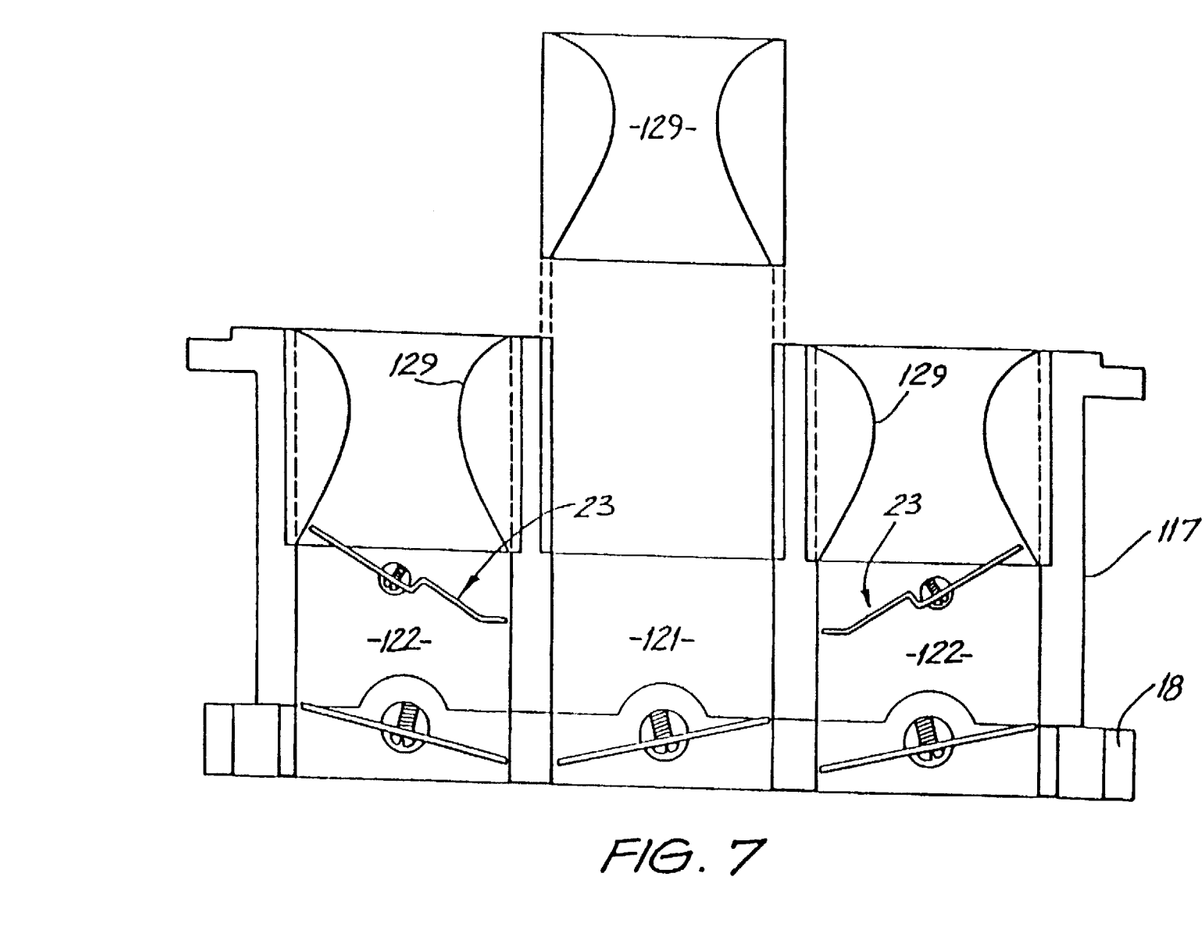
FIG. 7 shows in sectional elevation an alternative air control throttle.
Figure 8:
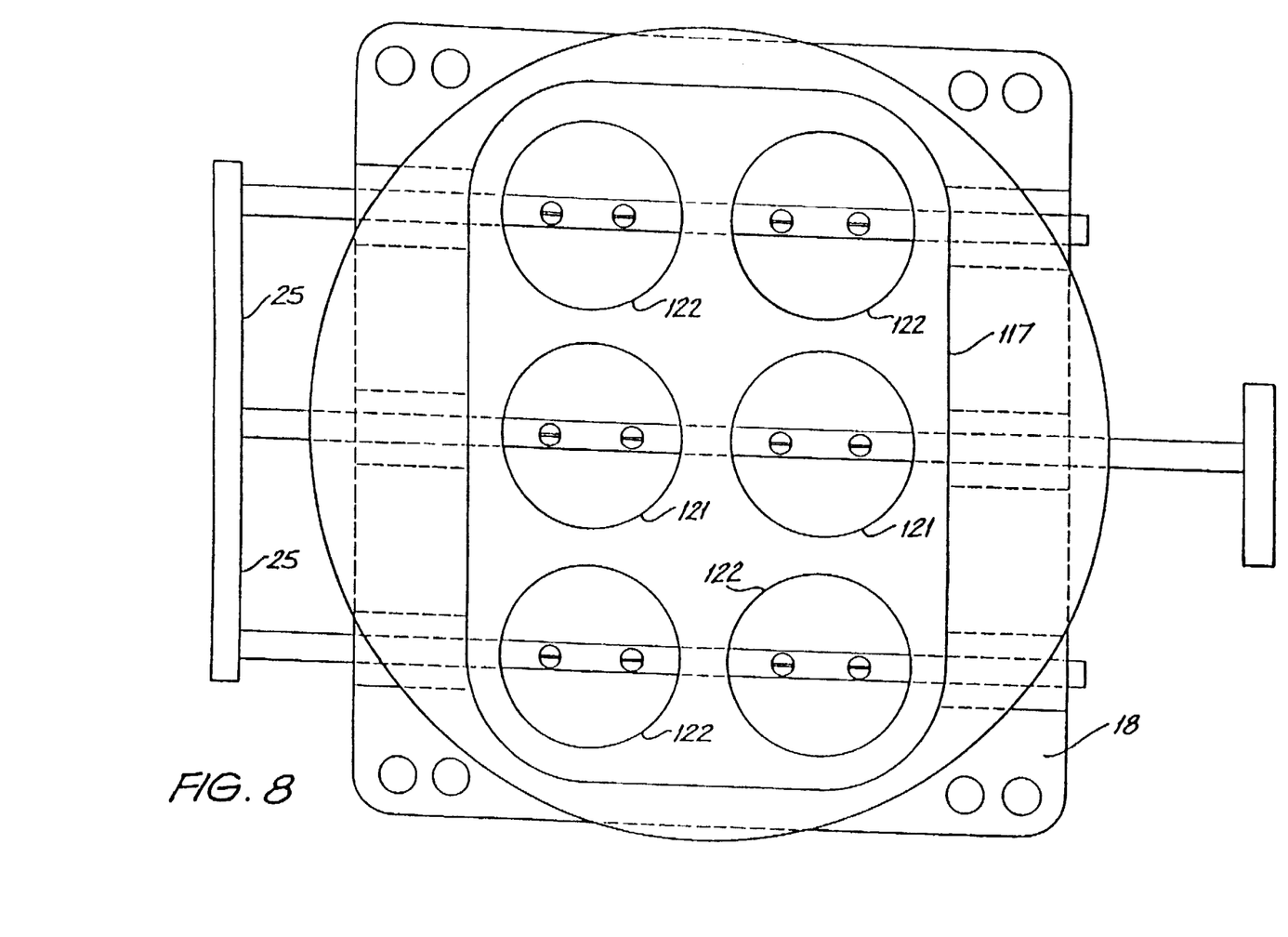
FIG. 8 shows in plan view the device of FIG. 7.

FIGS. 7 and 8 show a throttle body 117 having six equal sized throttle bores 121, 122, all with replaceable venturis 129. The centre pair of bores 121 form a pair of primary throttle bores and the outer four bores 122 form the secondary bores. Each throttle bore 121, 122 has a throttle valve, each secondary throttle valve being linked to open after the primary valve has been partly opened, and each secondary bore has an air valve, all as described above.

It has been found that the air flow rate through the air control throttle follows equation —8— (at the end of this description) to give the required CFM (Cubic Feet per Minute) rating for optimum air flow in a system utilising this invention.

This air control throttle device is particularly useful for controlling the air flow into engines fitted with direct port fuel injection and as an alternative to direct port fuel injection it is also useful as a throttle body injection unit (T.B.I.). The fuel injection units can be placed anywhere desired in accordance with well known design practice including in the bores of the throttle body 17 itself.

The intake valve head diameter A, as given by equation —9— where Z=125300, is suitable for valve to port angles of approximately 11°. For every 1° valve to port angle greater than 11° the amount of 41° will likely be subtracted from 125300 to determine the optimum intake valve diameter for this system.

And the exhaust valve head diameter AE is given by equation —10— where ZE=199700 is suitable for valve to port angles of approximately 11°. For every 1° valve to port angle greater than 11° the amount of 410 will likely be subtracted from 199700 to determine the optimum exhaust valve diameter for this system.

Figure 9:
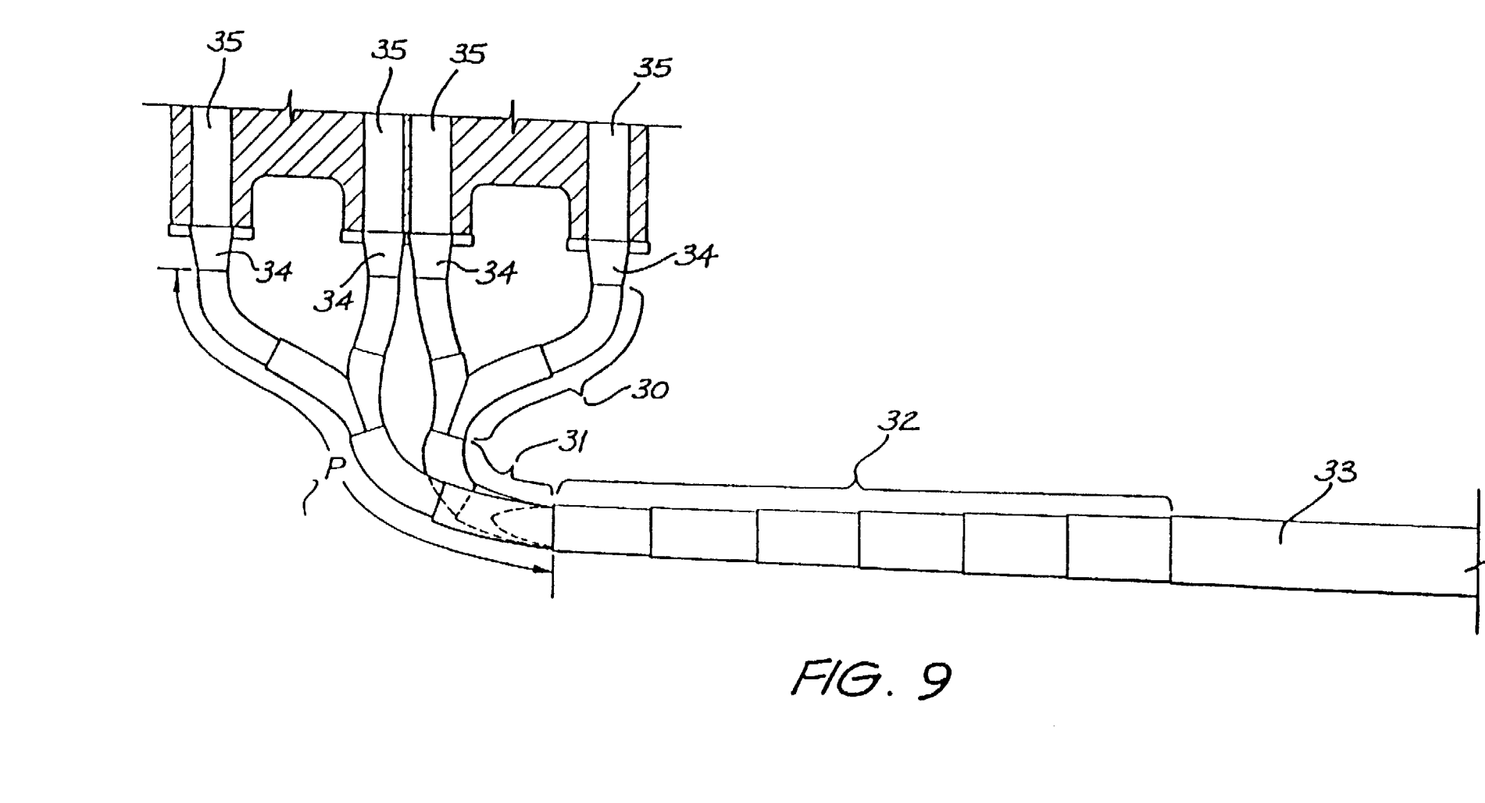
FIG. 9 shows the layout in plan view of an exhaust system in accord with a second aspect of the invention.

The exhaust plan layout shown in FIG. 9 includes primary exhaust sections 30, secondary exhaust sections 31, collector megaphone-diffuser sections 32 and tapered portions 34. The tapered portions lead straight from the engine exhaust ports 35 into the primary exhaust sections and are arranged for correct exhaust phasing, that is, pairs of primary sections 30, which join, lead from exhaust ports having valves opening exactly out of phase with one another. The tapered portions 34 of length T will have at their entry end a larger cross-sectional area than the exhaust port exit and taper at its exit end to an equivalent cross-sectional area to that of the entry into the primary exhaust sections 30.

The internal diameter W of the first primary exhaust sections 30 is given by the equation —6— at the end of this description.

The length P of the exhaust manifold sections 30 and 31 is given by the equation —7— at the end of this description, but the actual length may need to be slightly altered according to accommodating space in each particular installation.

The primary and secondary exhaust sections 30 and 31 will have 2–11 stepped sections each ⅛' (3 mm) larger in diameter. Most conveniently the exhaust sections 30–33 are made from standard available steel tubing which typically ranges in diameter by ⅛' steps.

Also the primary and secondary exhaust sections 30 and 31 will each have stepped sections equal in length for a total length P given by the equation —7—.

If either one of the primary or secondary sections 30, 31 respectively, needs to be reduced or increased in length from the suitable ½×length P, then the other one of the exhaust sections 30, 31 should be correspondingly altered so that the approximate length from the beginning of the primary exhaust section 30 to the end of the secondary exhaust section 31 equals length P.

The secondary sections 31 join into the collector megaphone-diffuser sections 32 also having the length P given by the equation —7— and commences with a ⅛" larger diameter to the exit end diameter of secondary sections 31. The megaphone-diffusers gradually taper outwardly, that is diverge, to a final diameter in the region ½"–⅜" larger than their initial diameter. The cross-sectional area of the megaphone-diffuser entry end will have 1½–2½ times the cross-sectional area of the first primary exhaust section entry end.

1½ times will produce more low end performance and 2½ times will produce more top end performance. In one convenient manufacturing method the megaphone-diffusers 32 are produced from approximately 4–11 equal length constant sections, each section being one standard size larger than the preceding section. More efficiently, in respect of reflecting pressure waves, the megaphone-diffusers may be fabricated to have smooth tapering walls.

It has been found that the effect of this exhaust design using very small to ⅛" (3 mm) larger diameter closely stepped pipes is to initially produce an extremely high-pressure release of gas through smaller primary exhaust pipe sections than the conventional larger bore exhaust pipes concurrently cause a higher than conventional gas flow velocity for two to three feet downstream of the exhaust port. This process imparts kinetic energy to the column flow in front of it and as this pressure energy enters each ⅛" (3 mm) larger diameter stepped pipe it causes a greater rarefaction than with conventional exhaust systems to extract residuals from the cylinders and concurrently encourages the high-pressure energy to accelerate the column flow in front of it into lower pressure environments (larger diameter pipes) thereby substantially reducing pressure build-up and creating a very high level of gas flow column inertia within the exhaust pipe system than with conventional systems. Additionally, sound waves effectively contribute to the performance of this exhaust system by allowing the (main pulse) positive pressure wave entering each ⅛" (3 mm) larger diameter pipe to reduce in amplitude with decrease in kinetic energy. This energy is imparted to the wave resulting in many reflections of the main pulse and moves in opposition thereto, to the large diameter end. In addition, because of the increased reflective action of the closely stepped pipes of this system, the total period over which (scavenging) negative pressure waves arrive at the exhaust valve is considerably prolonged. Thus effective superscavenging of the engine is accomplished through a wide range of engine speeds producing a very high and broad torque power curve.

From the exit end of the megaphone-diffuser sections 32 a constant diameter pipe 33 leads into a suitable silencer, and then a suitable length of tailpipe, being the same diameter or approximately ⅛" (3 mm) larger in diameter to the exit end of constant diameter pipe 33, leads to the end of the exhaust system at the rear of the vehicle. With this exhaust system optimum gas flow efficiency will have pipes with a minimal amount of bends, i.e., the pipes follow as straight a line as possible from the engine bay to the vehicle rear end.

It has been found that the effect of the small diameter pipe, short length exhaust manifold equations —6— and —7— with the modified camshaft valve timing and point of maximum lift, equations —11— and —12— dramatically increased low end to top end torque while enabling the engine to operate at peak RPM of 500 RPM less than a conventional larger diameter pipe, long length exhaust manifold.

It has been found that the effect of conventional camshaft valve timing and point of maximum lift with the small diameter, short length exhaust manifold will cause an excessive amount of unreacted air/fuel mixture to be drawn into the exhaust manifold during the overlap period, especially at low RPM, resulting in a large increase in fuel consumption with greatly reduced low and mid-range torque and the inability for the engine to idle in gear below 1200 RPM when compared to the modified camshaft valve timing and point of maximum lift specifications equations —11— and —12— which enables the engine to idle smoothly in gear at a very low 500 RPM and produce an unusually high and broad torque curve.

FORMULAE $$E = \sqrt{D^2 \times \frac{(S \times RPM)}{(360 \times X)}} \quad \text{OR} \quad 2\pi(1/2\, M^2) \tag{1}$$

$$T = \frac{(E - M) \times 360}{(6 +/- 2) \times 4\pi} \tag{2}$$

$$M = \sqrt{D^2 \times \frac{(s \times RPM)}{(F \times 360)}} \tag{3}$$

$$B = \sqrt{\frac{(OP + CL + EP) \times M^2}{IVOD}} \tag{4}$$

$$L^{\pm .050} = \frac{D^2 \times S \times RPM}{(A - 0.165) \times X \times \pi \times 360} \tag{5}$$

$$W = \sqrt{D^2 \times \frac{(s \times RPM)}{(R \times 360)}} \tag{6}$$

$$P = \left[ \frac{((G - 200) \times 120)}{(G)} - 120 \right] \times \left[ \frac{Y}{RPM} \right] \tag{7}$$

$$CFM = \frac{\frac{[(HP - V) \times 100]}{[v + 100]} \times V \times RPM}{266400} \tag{8}$$

$$A = \sqrt{D^2 \times \frac{(S \times RPM)}{Z}} \tag{9}$$

$$AE = \sqrt{D^2 \times \frac{(s \times RPM)}{ZE}} \tag{10}$$

$$I = \frac{(C - \Delta) \times J}{2C} + J \tag{11}$$

$$EX = \frac{(C - \Delta) \times (\pm H + 30)}{2C} \pm H(-Q) \tag{12}$$

$$CL = \frac{(VC - 45) \times I}{45} + I \tag{13}$$

$$CX = \frac{(VC - 45) \times EX}{45} - EX \tag{14}$$

$$k = \sqrt{D^2 \times \frac{(s \times RPM)}{(N \times 360)}} \tag{15}$$

$$IVOD = \frac{RPM}{22.73 - (0.3 \text{ per } 10c.i > 360c.i.) + (1.53 \text{ per } 500 \text{ rpm} > 5000 \text{ rpm})} \tag{16}$$

where

M=diameter of intake runner
E=diameter of tapered runner entry
W=diameter of exhaust manifold
D=diameter of piston Y = 3300 bottom end
  = 2100 mid-range
  = 900 top end F=550 ft/sec (intake) +/−50
1.5 F=820 ft/sec (inlet) +/−50
CFM=cubic feet per minute
V=total capacity of engine
VC=capacity of one cylinder
P=extractor/collector exhaust pipe length
B=diameter of balance hole
L=valve lift
A=diameter of intake valve head
AE=diameter of exhaust valve head K=diameter of exhaust pipe—(after collector)
C=original (intake/exhaust) pipe velocity
A=new (intake/exhaust) pipe velocity
T=tapered runner entry length
R=600 ft/sec (exhaust) +/−50
1.5R=900 ft/sec (exhaust) +/−50
IVOD=intake Valve Open Duration (measured at 0.050" Valve Lift)
OP=opening point of intake valve in degrees designated +ve when BTDC −ve when ATDC
CL=closing point of intake valve in degrees ABDC (scale)
CX=closing point of exhaust valve in degrees BTDC (scale)
EP=90° for 8 Cyl./60° for 6 Cyl./0° for 4 Cyl.
HP=brake horsepower
s=stroke length
Z=125300−(410 per 1°>11°)
J=original intake closing point in degrees
H=original exhaust closing point in degrees
I=new intake closing point
EX=new exhaust closing point
N=150 ft/sec (exhaust system) +/−50
G=average extractor/collector exhaust velocity
ZE=199700−(410 per 1°>11°)
Q=0°−20°@0.050" valve lift
RPM=revs per minute and $$X, \text{ the gas speed at the valve} = \frac{D^2 \times s \times RPM}{(A - 0.165)^2 \times 360}$$

lengths being measured in inches, speeds in feet per second, and capacity and volume in cubic inches.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A reciprocating piston internal combustion engine comprising:

at least one cylinder having a cylinder wall, at least one intake port and at least one exhaust port, the ports being disposed on the cylinder wall;

at least one intake valve disposed at a corresponding intake port for regulating a flow of intake gas into the cylinder;

at least one exhaust valve disposed at a corresponding exhaust port for regulating a flow of exhaust gas out of the cylinder;

a piston in the cylinder mounted for reciprocal motion within the cylinder, the piston further being adapted to assume a bottom dead center position and a top dead center position; and a plurality of manifold tubes comprising:

a least one intake manifold tube connected to a corresponding intake port;

at least one exhaust manifold tube connected to a corresponding exhaust port;

wherein each of the intake manifold tubes comprises a plurality of pipes connected end to end and including an end pipe disposed closest to a corresponding port, each of the pipes having a constant cross-section, the cross section of the pipes increasing incrementally in a direction away from the end pipe, and a tapered portion being connected to the end pipe at the exit end thereof, and to an adjacent one of the pipes at the entry end thereof; and further including a plenum chamber device comprising an intake manifold, the intake manifold having at least one manifold outlet connected to a corresponding intake manifold tube, the plenum chamber device thereby being disposed upstream of and in flow communication with the intake port.

2. The reciprocating piston internal combustion engine according to claim 1 wherein:

at least one intake port includes a plurality of intake ports; and the plenum chamber device is divided into two similar chambers.

3. The reciprocating piston internal combustion engine according to claim 2 further including a plate for dividing the plenum chamber device into the two similar chambers, the plate having at least one balancing hole at a central region thereof.

4. The reciprocating piston internal combustion engine according to claim 3 wherein the balance hole is radiused.

5. The reciprocating piston internal combustion engine according to claim 1 wherein the intake manifold of the plenum chamber device includes a manifold inlet located at a top center region thereof, and internal manifold walls defining smooth radiused transitions from the manifold inlet to the manifold outlet.

6. The reciprocating piston internal combustion engine according to claim 1 wherein:

at least one intake port includes a plurality of intake ports;

at least one manifold outlet includes a plurality of manifold outlets each corresponding to a respective intake manifold tube, at least one of the plurality of manifold outlets meeting its respective manifold tube at a right angle thereto, the respective manifold tube further meeting its respective intake port at a right angle thereto, the respective manifold tube being thereby curved.

7. The reciprocating piston internal combustion engine according to claim 6 wherein:

the plurality of intake ports include at least four intake ports;

at least one intake manifold tube includes at least two intake manifold tubes leading to the two chambers of the plenum chamber device.

8. The reciprocating piston internal combustion engine according to claim 7 wherein at least one intake manifold tube includes a first pipe connected to a second pipe which is in turn connected to a third pipe, the third pipe being the end pipe, a cross section of the first pipe being larger than a cross section of the second pipe and the cross section of the second pipe being larger than a cross section of the third pipe, at least one intake manifold tube further including tapered portions disposed to connect the first pipe to the second pipe and the second pipe to the third pipe for providing a smooth flow transition into each of the pipes.

9. The reciprocating piston internal combustion engine according to claim 7 wherein:

each of the two intake manifold tubes includes two tertiary pipes of constant cross section and one secondary pipe of constant cross section joined to the two tertiary pipes such that the tertiary pipes form a fork with respect to the secondary pipe, each of the tertiary pipes being a respective end pipe;

the plurality of manifold tubes further includes a primary pipe of constant cross section joined to the secondary pipes of the two intake manifold tubes such that the secondary pipes form a fork with respect to the primary pipe, the cross section of the primary pipe being larger than the cross section of the secondary pipes, and the cross section of the secondary pipes being larger than the cross section of the tertiary pipes; and the tapered portion of each of the two intake manifold tubes is a first tapered portion, each of the two intake manifold tubes further including a second tapered portion connecting the secondary pipes to the primary pipe for providing a smooth flow transition into each of the pipes.

10. The reciprocating piston internal combustion engine according to claim 7 wherein:

the two chambers of the plenum chamber device are located centrally, and vertically above the intake manifold;

the tapered portion is a first tapered portion, each of the manifold tubes further including a second tapered portion having an entry end and an exit end, a cross section of the exit end being larger than a cross section of the entry end; and one of the plurality of pipes is a curved pipe connecting the entry end of the second tapered portion to at least one of the two chambers of the plenum chamber.

11. The reciprocating piston internal combustion engine according to claim 7 wherein:

the two chambers of the plenum chamber device are disposed at opposite sides of at least one cylinder;

the tapered portion is a first tapered portion, each of the manifold tubes further including a second tapered portion having an entry and an exit end, a cross section of the exit end being larger than a cross section of the entry end; and one of the plurality of pipes provides a smooth flow transition connecting the entry end of the second tapered portion to at least one of the two chambers of the plenum chamber.

12. A reciprocating piston internal combustion engine comprising:

at least one cylinder having a cylinder wall, at least one intake port and at least one exhaust port, the ports being disposed on the cylinder wall;

at least one intake valve disposed at a corresponding intake port for regulating a flow of intake gas into the cylinder;

at least one exhaust valve disposed at a corresponding exhaust port for regulating a flow of exhaust gas out of the cylinder;

a piston in the cylinder mounted for reciprocal motion within the cylinder, the piston further being adapted to assume a bottom dead center position and a top dead center position; and a plurality of manifold tubes comprising:
at least one intake manifold tube connected to a corresponding intake port;
at least one exhaust manifold tube connected to a corresponding exhaust port;

a plenum chamber device comprising an intake manifold, the intake manifold having at least one manifold outlet connected to a corresponding intake manifold tube, the plenum chamber device thereby being disposed upstream of and in flow communication with the intake port, wherein each of the intake manifold tubes comprises a plurality of pipes connected end to end and including an end pipe disposed closest to a corresponding intake port; and the plurality of pipes further includes at least one tapered tube connected at a large end thereof to the plenum chamber and at a smaller end thereof to the end pipe, the tapered tube being longer than the end pipe.

* * * * *